US011079735B2

United States Patent
Amthor et al.

(10) Patent No.: US 11,079,735 B2
(45) Date of Patent: Aug. 3, 2021

(54) CONTROL SYSTEM AND METHOD FOR OPERATING A CONTROL SYSTEM WITH REAL CONTROL AND VIRTUAL CONTROL

(71) Applicant: Siemens Aktiengesellschaft, München (DE)

(72) Inventors: Karl-Josef Amthor, Seefeld (DE); Guido Seeger, Balersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/760,965

(22) PCT Filed: Aug. 12, 2016

(86) PCT No.: PCT/EP2016/069253
§ 371 (c)(1),
(2) Date: Mar. 16, 2018

(87) PCT Pub. No.: WO2017/045847
PCT Pub. Date: Mar. 23, 2017

(65) Prior Publication Data
US 2018/0267504 A1 Sep. 20, 2018

(30) Foreign Application Priority Data
Sep. 18, 2015 (EP) .................................... 15185936

(51) Int. Cl.
*G05B 19/4069* (2006.01)
*G05B 17/02* (2006.01)

(52) U.S. Cl.
CPC ......... *G05B 19/4069* (2013.01); *G05B 17/02* (2013.01); *G05B 2219/23445* (2013.01);
(Continued)

(58) Field of Classification Search
CPC ................ G05B 19/4069; G05B 17/02; G05B 2219/33324; G05B 2219/33301;
(Continued)

(56) References Cited

U.S. PATENT DOCUMENTS 6,831,820 B2   12/2004   Schwesig et al.
8,855,792 B2   10/2014   Landgraf
(Continued)

FOREIGN PATENT DOCUMENTS

DE   10353051 A1   6/2005
DE   102013100465 A1   7/2014
(Continued)

OTHER PUBLICATIONS

CNC-Handbuch 2013/2014; Hans B. Kief; Helmut A. Roschiwal; Tell 5, Kap. 4 "Fertigungs-Simulation"; 2013.
(Continued)

*Primary Examiner* — Kenneth M Lo
*Assistant Examiner* — Mohammed Shafayet
(74) *Attorney, Agent, or Firm* — Henry M. Feiereisen LLC

(57) ABSTRACT

When carrying out an industrial process or during the operation of an industrial system or machine, relevant data is to be detected without additionally loading the control of the industrial process or the system or machine in question. For this purpose, the invention provides a control system (1, 4, 5; 1', 4', 5'; 1", 4", 5") with a real control (1; 1'; 1") for controlling an industrial process, a system or a machine; a virtual control (4; 4'; 4") for simulating the control of the industrial process, the system, or the machine; synchronization means for synchronizing the real control (1; 1'; 1") and the virtual control (4; 4'; 4"); and a higher-level processor unit (5; 5'; 5") for detecting and/or generating operating data and/or state data with respect to the process, the
(Continued)

system, or the machine, wherein the operating data and/or state data is based on data originating from the virtual control (4; 4'; 4"). By requesting the data from the virtual control (4; 4'; 4"), the real control (1; 1'; 1") is not additionally loaded.

10 Claims, 2 Drawing Sheets

(52) U.S. Cl.
CPC .............. *G05B 2219/31372* (2013.01); *G05B 2219/33301* (2013.01); *G05B 2219/33324* (2013.01); *Y02P 90/02* (2015.11)

(58) Field of Classification Search
CPC ........... G05B 2219/23445; G05B 2219/31372; Y02P 90/12
See application file for complete search history.

(56) References Cited

U.S. PATENT DOCUMENTS

| | | | | |
|---|---|---|---|---|
| 2003/0236579 A1* | 12/2003 | Hauhia | ............... | G05B 19/0428 700/79 |
| 2004/0065533 A1* | 4/2004 | Schwesig | ........... | G05B 19/0428 200/410 |
| 2005/0071802 A1* | 3/2005 | Brakelmann | ...... | G05B 19/4069 717/100 |
| 2005/0102054 A1* | 5/2005 | Dolansky | ........... | G05B 19/4069 700/182 |
| 2006/0095230 A1* | 5/2006 | Grier | .................. | G05B 23/0216 702/183 |
| 2007/0061037 A1* | 3/2007 | Grossmann | ........ | G05B 19/4069 700/182 |
| 2007/0093929 A1* | 4/2007 | Kreidler | ............... | G05B 19/042 700/169 |
| 2008/0091394 A1* | 4/2008 | Hahn | ................. | G05B 19/4069 703/7 |
| 2008/0120080 A1* | 5/2008 | Nasle | ..................... | G05B 17/02 703/13 |
| 2008/0147209 A1* | 6/2008 | Landgraf | ............... | G05B 17/02 700/29 |
| 2008/0263407 A1* | 10/2008 | Yamamoto | .......... | G06F 11/0712 714/44 |
| 2009/0164202 A1* | 6/2009 | Lonnemark | ............... | G06F 8/52 703/22 |
| 2009/0299509 A1* | 12/2009 | Diezel | ................ | G05B 19/4069 700/97 |
| 2010/0153073 A1* | 6/2010 | Nagatsuka | .......... | G05B 19/4069 703/1 |
| 2011/0035044 A1* | 2/2011 | Takahashi | .......... | G05B 19/4069 700/178 |
| 2011/0077926 A1* | 3/2011 | Amthor | .............. | G05B 19/4069 703/6 |
| 2011/0202146 A1* | 8/2011 | Heil | ......................... | G05B 9/02 700/12 |
| 2012/0191233 A1* | 7/2012 | Zwanziger | ............. | G05B 17/02 700/95 |
| 2013/0191106 A1* | 7/2013 | Kephart | ........... | G05B 19/41885 703/21 |
| 2013/0212420 A1* | 8/2013 | Lawson | ............. | G05B 19/4185 713/400 |
| 2014/0172403 A1* | 6/2014 | Rathgeb | ................ | G05B 17/02 703/21 |
| 2015/0019191 A1* | 1/2015 | Maturana | .......... | G05B 19/0423 703/13 |
| 2016/0327939 A1* | 11/2016 | Yang | .................... | G05B 19/414 |

FOREIGN PATENT DOCUMENTS

| | | |
|---|---|---|
| DE | 202014104791 U1 | 11/2014 |
| EP | 1901149 A2 | 3/2008 |
| EP | 1933214 A2 | 6/2008 |
| EP | 1932618 B1 | 11/2010 |
| EP | 2833223 A1 | 2/2015 |

OTHER PUBLICATIONS

PCT International Search Report and Written Opinion of International Searching-Authority dated Oct. 25, 2016 corresponding to PCT International Application No. PCT/EP2016/069253 filed Aug. 12, 2016.

\* cited by examiner

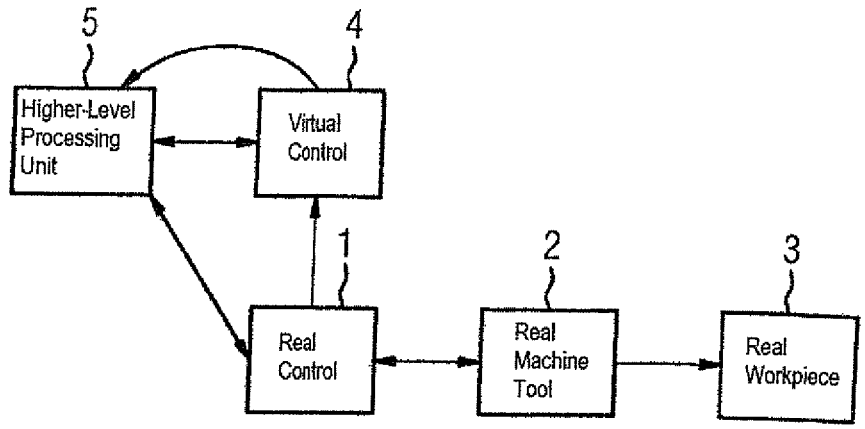
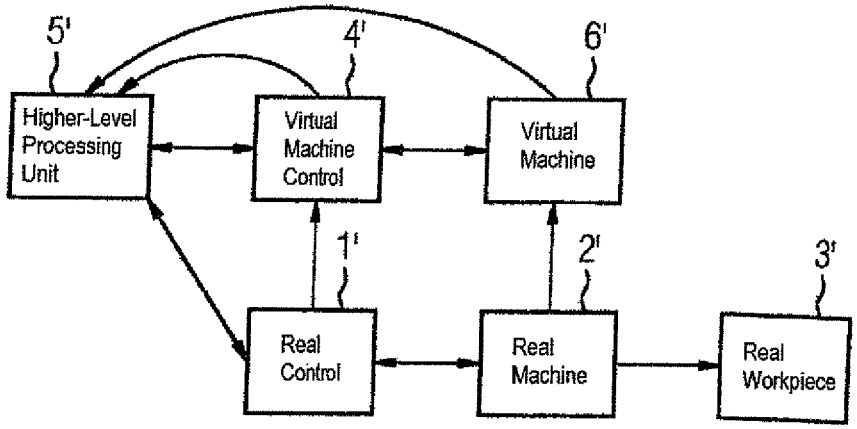
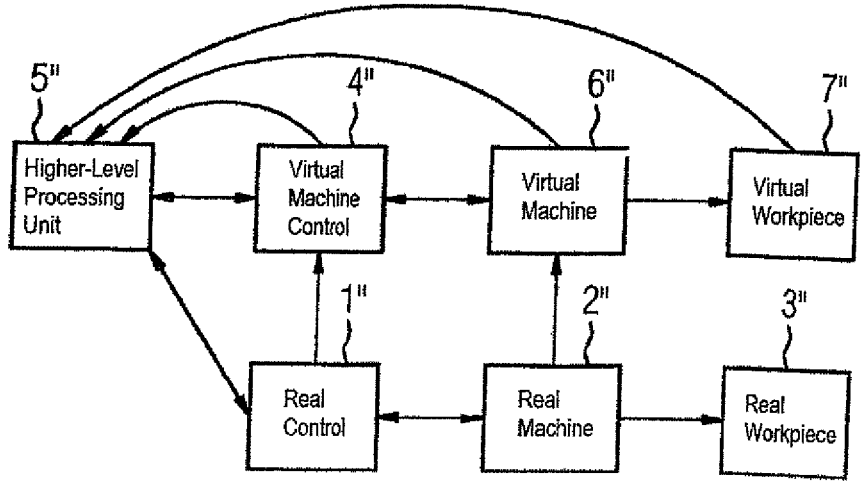

CONTROL SYSTEM AND METHOD FOR OPERATING A CONTROL SYSTEM WITH REAL CONTROL AND VIRTUAL CONTROL

CROSS-REFERENCES TO RELATED APPLICATIONS

This application is the U.S. National Stage of International Application No. PCT/EP2016/069253, filed Aug. 12, 2016, which designated the United States and has been published as International Publication No. WO 2017/045847 and which claims the priority of European Patent Application, Serial No. 15185936.0, filed Sep. 18, 2015, pursuant to 35 U.S.C. 119(a)-(d).

BACKGROUND OF THE INVENTION

The invention relates to a control system, comprising a real control for controlling an industrial process, a plant or a machine and a virtual control for simulating the control of the industrial process, the plant or the machine.

The production of workpieces with the aid of numerically controlled machine tools and other production machines must satisfy many requirements. Above all, workpieces with a defined quality must be produced in the shortest time possible. Downtimes, for example, as a result of wear, failure or damage of machine components or tools must be avoided. Workpieces which lie outside the permissible production tolerances must be avoided or at least detected and, if necessary, discarded.

The situation is similar for the control of industrial plants or industrial processes. Here too, downtimes are associated with high costs and therefore to be avoided at all costs.

To measure "process quality" continuously and to detect harmful trends in good time, the operators of the machines or plants rely on both integrated and external monitoring of process data of all kinds. For standard problems for which all the relevant signals are available directly in the control, the control manufacturer or the machine manufacturer can provide integrated process data acquisition and process monitoring which the end user can then access as required.

In many cases, however, the machine operator has special requirements, i.e. he requires further data and evaluations to keep his production running optimally. He then supplements machine control with self-defined and projected "machine data acquisition" or "operating data acquisition" (MDE/BDE) by using and appropriately configuring a self-configurable functionality of the machine control. According to this configuration, relevant process data is then sent from machine control to higher-level control systems, for example, an MES (Manufacturing Execution System) and evaluated there.

Such data acquisition encumbers the machine control with additional tasks and must usually be coordinated with the machine manufacturer as the planning of the control with respect to the delivery state must be changed. Furthermore, the specific boundary conditions of a machine/control combination must be taken into account in each case. The machine operator can scarcely rely on resources in the control having been kept free for his requirements in terms of quality assurance With each change, moreover, he runs the risk of reducing the productivity of the machine as a result of the additional burden entailed by process data acquisition because then less computing power is available for the actual control task.

From Kief "CNC Handbook" 2013/2014; Part 5, Chapter 4 "Manufacturing Simulation", the simulation of a control and a machine by means of a so-called virtual control and a virtual machine are known.

From EP1932618B1 the observation of the working space of a machine tool by means of a camera is known, wherein the camera image is displayed on a screen, wherein synchronously with the real machining of a workpiece in the machine tool, a simulation of the machining is calculated and wherein it is possible to switch between the camera image and a virtual image generated by the simulation.

SUMMARY OF THE INVENTION

The object of the present invention is therefore to compile data relevant to the performance of an industrial process and/or to the operation of an industrial plant or machine and to minimize the loading of the control necessary for this data acquisition for the industrial process and/or the plant or machine in question.

According to one aspect of the invention, the object is achieved by a control system which includes a real control for controlling an industrial process, a plant or a machine, a virtual control for simulating the control of the industrial process, the plant or the machine, synchronization means for synchronizing the real control and the virtual control, a higher-level processor unit for detecting data with respect to the process, the plant or the machine and for processing this data, wherein the data detected by the higher-level processor unit can be transferred from the virtual control to the higher-level processor unit.

According to another aspect of the invention, the object is achieved by a method for operating a corresponding control system, wherein an industrial process, a plant or a machine is controlled by a real control, the control of the industrial process, the plant or the machine by a virtual control is simulated, the real control and the virtual control are synchronized, a higher-level processor unit detects and processes data with regard to the process, the plant or the machine, wherein the data detected by the higher-level processor unit is transferred from the virtual control to the higher-level processor unit.

The invention can be advantageously used in conjunction with a plurality of different controls for controlling industrial processes, plants or machines. These include, in particular, memory-programmable controls (SPS) for controlling industrial processes or plants and numerical controls (CNC) for controlling machine tools, production machines, robots, etc. The term "control" is not to be understood strictly in the sense of systems theory in connection with the invention and naturally also comprises control devices and/or control processes.

In addition to an aforementioned real control, a control system according to the invention also provides for a corresponding virtual control which simulates the behavior of the real control as accurately as possible. In connection with the invention it is important that in the virtual control all the control parameters relevant to the control of the process, the plant or machine are present at least for the most part synchronously to the real control. The real control thus obtains a "virtual double" at its side which performs the same control task as a simulation and in step with the real control. Control orders are sent both to the real and to the virtual control and performed by both in parallel. This results in the widest possible consistency of the data in the real control and in the virtual control.

As incidents may also arise in the real plant and/or machine which are unknown from the outset, information and/or data in this regard is transferred from the real control to the virtual control. As a result of this data transfer, the virtual control which runs in parallel with the real control is supported such that it simulates reality—at least in certain areas—very accurately. Almost all the data in the real control is then also present in the virtual control and can be retrieved from the latter. The retrieval of data from the virtual control does not load the real control.

Almost no limits are set for the user with regard to the data which is transferred from the virtual control to the higher-level processor unit. This may include all the sensor signals originating from the real machine or plant, for example, with regard to temperature, rotational speed, pressure, etc. Furthermore, this includes all data relating to states of the machine and/or plant and/or control (on, off, startup, etc.). Moreover, all the operating data of the real and/or virtual machine and the real and/or virtual control may also be included such as, for example, operating hours, number of manufactured parts, type of manufactured parts, data with regard to quality of the manufactured parts. Furthermore, the data transferred from the virtual control to the higher-level processor unit can already be prepared, for example, by means of statistical evaluations of the data concerned, in particular in the virtual control, having already taken place (e.g. number of manufactured parts in a particular time unit). In addition to the aforementioned operating data and state data, furthermore, diagnostics data can also be transferred from the virtual control to the higher-level processor unit. This includes all data with regard to malfunctions, downtimes etc.

For synchronization of the real control and the virtual control, it is necessary that the sensor signals relevant to the control of the machine or plant are also made available to the virtual control. These include, for example, axis positions, rotational speeds or a plurality of further sensor signals, for example, with regard to temperature, pressure, position, etc. The sensor signals concerned are preferably sent in parallel to the real and the virtual control. However, it is also possible that sensor signals are forwarded by way of the real control to the virtual control.

In order to enable at least approximately synchronous operation of the real control and the virtual control, the synchronization means necessary for this comprise correspondingly fast data connections between the real control and the virtual control and/or between the plant or machine and the virtual control. Furthermore, the real and the virtual control also have corresponding software known per se to a person skilled in the art to ensure the synchronicity required in connection with the invention.

Furthermore, advantageously time-based data is transferred to the virtual control for synchronizing the virtual control with the real control. As a result, in particular a synchronous execution of a control program, for example, a part program of a machine tool, can be performed. Furthermore, state-based data is also advantageously transferred from the real control to the virtual control. State-based data reflects system states of the real control, the real machine or the real plant. These include, in particular, many items of data with regard to sensor signals of the sensors in a machine or plant. These range from simple switch positions through temperature, pressure, position to data with regard to rotational speeds or axis positions. The desired synchronicity can be achieved between the real control and the virtual control by transferring the corresponding data. Unforeseen states, for example, an interruption not detected by a parts program of the machining of a workpiece by means of a machine tool, for example, due to a change of tool on account of breakage or wear, are thus also detected by the virtual control.

When operating plants or machines it is usual to transfer operating data or state data relating to the controlled processes, plants or machines to higher-level processor units such as, for example, an MES (Manufacturing Execution System), in order to be able to perform, for example, statistical evaluations relating to the processes, plants or machines concerned there. The transfer of extensive data from the control to the higher-level processor unit is necessary for this. In order to avoid additionally loading the real control excessively, the invention provides that the necessary operating data and/or state data is not transferred from the real control, but from the virtual control to the higher-level processor unit. As a result, the real control is not additionally loaded by the higher-level processor unit. It must only be ensured that the virtual control can transfer the requested data to the higher-level processor unit without losing synchronicity with the real control in the process. However, this can always be ensured by corresponding computing power of the virtual control and by corresponding data connections between the virtual control and the higher-level processor unit. The corresponding means only have to be made available, which is easily possible in the case of the virtual control, however.

In the case of the higher-level processor unit, a process control system, for example, a SCADA (Supervisory Control and Data Acquisition) system for supervising and/or controlling technical processes, plants or machines may be involved. Moreover, the higher-level processor unit can also be used for control at the operations management level and be advantageously designed as an MES (Manufacturing Execution System) for this purpose. Such a system enables the guidance, direction, management or control of production and comprises, in particular, the recording of operating data and machine data for this purpose. Furthermore, the higher-level processor unit could also be an ERP (Enterprise Resource Planning) system which records and evaluates data with regard to the operating means employed at management level.

It is furthermore advantageous that the virtual control is connected to a virtual machine or plant. Not only the behavior of the control is thus simulated but also the machine and/or plant itself. Advantageously, according to the invention not only the data relating to the virtual control but also the data relating to the virtual machine or plant can then be transferred to the higher-level processor unit. Data transfer between the real machine and the virtual machine is also provided particularly advantageously such that the virtual machine can be adjusted to the real machine or plant, in particular during operation. As a result, for example, certain states of the real machine or plant which in particular are recorded as a function of sensor signals can also be taken into consideration during simulation by means of the virtual machine.

Particularly advantageously, the real control is designed as a CNC control (Computerized Numerical Control) for controlling a machine tool and connected to a machine tool and the virtual control is designed as a virtual CNC and connected to a virtual machine tool. Then even data regarding a virtual workpiece manufactured by the virtual machine tool can be transferred to the higher-level processor unit.

BRIEF DESCRIPTION OF THE DRAWING

The invention is explained in more detail hereinafter with reference to exemplary embodiments. In the diagrams:

FIG. 1 shows data acquisition for a machine tool by means of a virtual control,

FIG. 2 shows data acquisition for a machine tool by means of a virtual control and a virtual machine, FIG. 3 shows data acquisition for a machine tool by means of a virtual control, a virtual machine and a virtual workpiece.

DETAILED DESCRIPTION OF PREFERRED EMBODIMENTS

Figure 4:
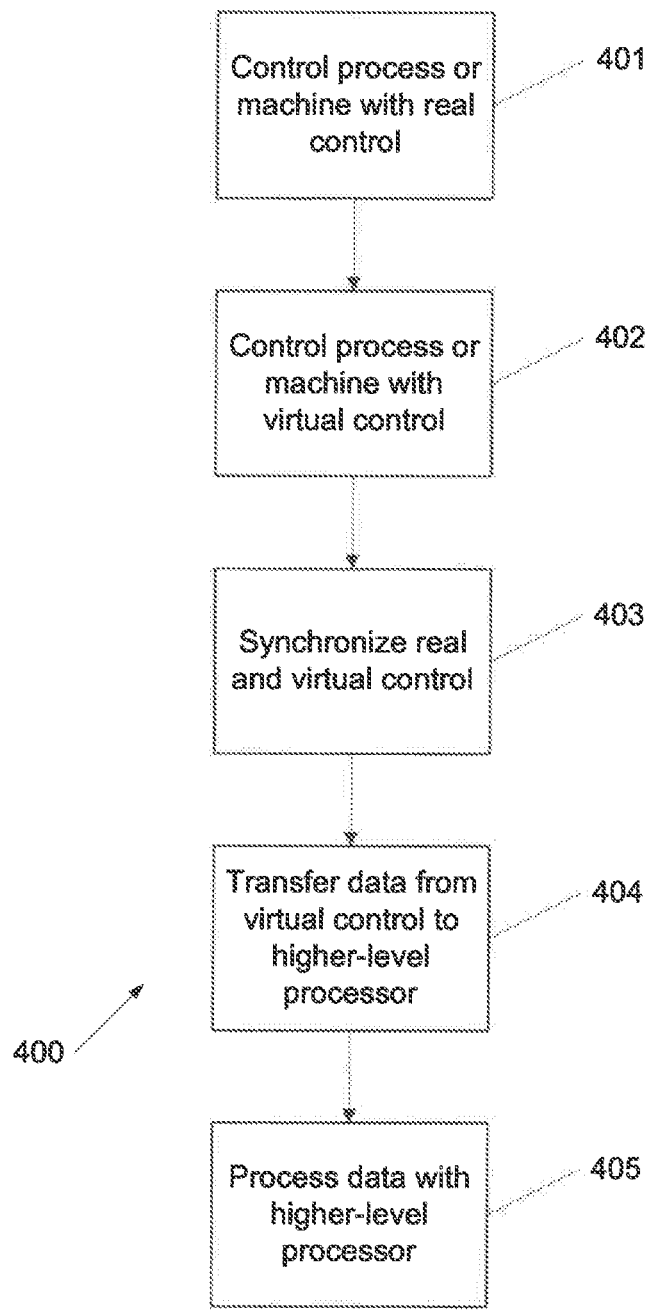
FIG. 4 shows a process flow diagram of the method according to the present invention.

FIG. 1 shows a real control 1 for controlling a real machine tool 2 in greatly simplified and schematized form. Advantageously, the real control 1 is designed as a Computerized Numerical Control (CNC). The CNC 1 controls the machine tool 2 for the manufacture of a real workpiece 3. As a rule, a machine tool is not operated autonomously but as part of a larger production network together with further machine tools for the manufacture of certain goods. In the process, it is necessary to coordinate production by means of the individual machine tools. For this purpose, from each individual machine tool, in particular their control, corresponding data relating to type, number, quality, etc. of the manufactured workpieces are transferred to a higher-level processor unit 5. The higher-level processor unit 5 can be a process control system, in particular, a SCADA, an MES or an ERP system.

In the exemplary embodiment, the higher-level processor unit 5 is to be executed as an MES system. According to the invention, in addition to the real control 1 there is a virtual control 4 which is advantageously based on standard hardware and simulates the real control 1 as far as possible. In particular, the virtual control 4 executes the same parts program as the real control 1. There is a data connection between the real control 1 and the virtual control 4 for synchronizing the two controls. By means of the data transferred in this way, for example, incidents on the real machine 2 can be recorded by means of the control 1 and transferred to the virtual control 4 such that, to ensure the synchrony between the real control 1 and the virtual control 4, real machine data is also taken into consideration by the virtual control. According to the invention, the MES system preferably now no longer accesses the control 1 directly but extracts the necessary data either solely or at least mainly from the virtual control 4. Data acquisition therefore remains at least approximately reaction-free for the current real control and/or machine. As the virtual control is based on standard hardware and standard software and is not subject to rigorous real-time conditions, any resource bottlenecks can be resolved by replacing this standard hardware and software. An intervention in the real control 1 is not necessary for this, such that production safety is not endangered. In addition, expensive downtimes, which are always inevitable with upgrades, are avoided. Changes to existing data acquisition can be tested at short notice. If they prove effective for optimizing production, they can be easily transferred to other virtual controls. If a corresponding test is unsuccessful, they will be withdrawn again with minimal effort.

In the exemplary embodiment according to FIG. 2, functional blocks having the same function as FIG. 1 are given the same reference character, supplemented by a line in each case. Unlike FIG. 1, the exemplary embodiment according to FIG. 2 also comprises a virtual machine 6' by means of which the behavior of the real machine 2' can be simulated as realistically as possible. Relevant data with regard to the real machine 2' can therefore be accessed directly without deviation of the virtual machine control 4' directly from the virtual machine 6', provided that the latter has a corresponding interface for data acquisition. This enables the precise acquisition of the relevant data. Inaccuracies as a result of scanning effects and data conversions are thus avoided. Control experts do not have to be consulted as frequently because the virtual control 4' does not have to answer all the requests.

In a further advantageous embodiment of the invention, the real workpiece 3 is now also simulated by a virtual workpiece which in FIG. 3 is given the reference character 7". Insofar as the real workpiece 3" is also simulated by a virtual workpiece 7" and the latter provides an interface for data acquisition, the relevant data can be directly accessed there, without diversions by way of the virtual machine 6" and/or the virtual machine control 4". This also facilitates and accelerates the retrieval of the data concerned.

According to the method of the invention, a process 400 of an industrial process, a plant or a machine is controlled by a real control, at step 401. The process 400 is also controlled by a virtual control, at step 402, which simulates the real control and executes the same parts program. At step 403, the data are synchronized between the real control and the virtual control. At step 404, the data are then transferred from the virtual processor to a higher level processor where they are processed, at step 405.

In summary, the production operator obtains complete transparency for each state which is made accessible in the virtual system by way of query interfaces, without influencing current production. The only constraints are his implementation effort and the performance of the flow platform for the virtual system. However, he can easily avoid these by means of corresponding hardware and software components. The flow platform must be so powerful that the virtual part system can follow the real system on average. Speed fluctuations as a result of brief resource bottlenecks are permitted in the virtual part system and can be bridged by buffering of supporting state information from the real system. The virtual part system permanently falling behind would no longer serve the purpose of operating data acquisition, however.

As a rule, the machine manufacturer need not importuned by changes as once set up, the configuration remains unchanged. The production operator is also the operator of the virtual system and has full sovereignty over its functionality and can use this sovereignty for his own purposes, as long as he does not change the parts which are essential for the correct simulation of the real behavior.

Only in cases in which additional information is required from the real machine control in order to increase the tracking accuracy of the virtual system must the configuration of the real machine control be changed subsequently.

The invention claimed is:

1. A control system, comprising:
   a real control configured to execute a real control program to control a real industrial process, a real plant or a real machine in real time;

a virtual control configured to execute a virtual control program to control a virtual industrial process, a virtual plant or a virtual machine which simulates control of the real industrial process, the real plant or the real machine, wherein the virtual control program is identical to the real control program and performs as a simulation the same control task and in step with the real control and is executed time-synchronously with the real control program while the real industrial process, the real plant or the real machine are operating; and a higher-level processor unit in data communication with the virtual control, the higher-level processor unit receiving diagnostic data with respect to the virtual industrial process, the virtual plant or the virtual machine from the virtual control, wherein most of the diagnostic data are received from the virtual control so as not to additionally burden the real control by reading out the diagnostic data while the real industrial process, the real plant or the real machine are operating and processing the diagnostic data for analysis without losing synchronicity with the real control in the process.

2. The control system of claim 1, wherein the diagnostic data transferred from the virtual control to the higher-level processor unit further includes operating data and/or state data.

3. The control system of claim 1, wherein the real control is configured to transfer time-based data and/or state-based data to the virtual control for time-synchronizing the virtual control with the real control.

4. The control system of claim 1, wherein the real control is configured as a CNC (Computerized Numerical Control) for controlling a machine tool.

5. The control system of claim 1, wherein the real control is connected to a real machine or plant, and the virtual control is connected to a virtual machine or plant.

6. A method for operating a real industrial process, a real plant or a real machine, comprising:
   executing a real control program which controls the real industrial process, the real plant or the real machine by a real control;
   executing a virtual control program controlling a virtual industrial process, a virtual plant or a virtual machine which simulates the real control of the real industrial process, the real plant or the real machine by a virtual control, wherein the virtual control program is identical to the real control program and performs as a simulation the same control task and in step with the real control and is executed time-synchronously with the real control program while the real industrial process, the real plant or the real machine are operating; and
   receiving diagnostic data with respect to the virtual industrial process, the virtual plant or the virtual machine by a higher-level processor unit in data communication with the virtual control from the virtual control, wherein most of the diagnostic data are received from the virtual control so as not to additionally burden the real control by reading out the diagnostic data while the real industrial process, the real plant or the real machine are operating, and processing the diagnostic data for analysis without losing synchronicity with the real control in the process.

7. The method of claim 6, wherein the diagnostic data transferred from the virtual control to the higher-level processor unit further includes operating data and/or state data.

8. The method of claim 6, further comprising transferring time-based data and/or state-based data from the real control to the virtual control for time-synchronizing the virtual control with the real control.

9. The method of claim 7, further comprising generating service data in response to a detection of the operating data and/or state data by the higher-level processor unit.

10. The method of claim 9, further comprising transferring the service data automatically to a service provider.

* * * * *